Patented Feb. 13, 1945

2,369,161

UNITED STATES PATENT OFFICE 2,369,161

SYNTHESIS OF VITAMIN A

Nicholas A. Milas, Belmont, Mass., assignor to Research Corporation, New York, N. Y., a corporation of New York No Drawing. Application March 3, 1942,
Serial No. 433,227

6 Claims. (Cl. 260—617)

The general object of the present invention is to provide a novel process for the synthetic production of vitamin A and a number of related intermediate products.

The accepted chemical structure of vitamin A is represented by the formula:

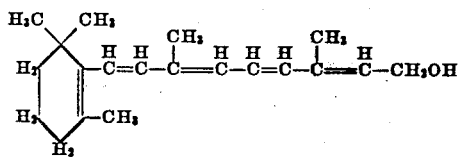

Compound I

It readily may be seen that vitamin A, as well as other antixerophthalmic carotenoids (antixerophthalmic provitamins), are related to β-ionone which is a well known substance used as an important ingredient in the synthesis of perfumes.

The first step in my process consists in the condensation of β-ionone with ethyl chloroacetate (see Equation A) in the presence of solid anhydrous sodium ethylate, using anhydrous toluene or benzene as solvents, thereby producing Compound II, Equation A.

EQUATION A

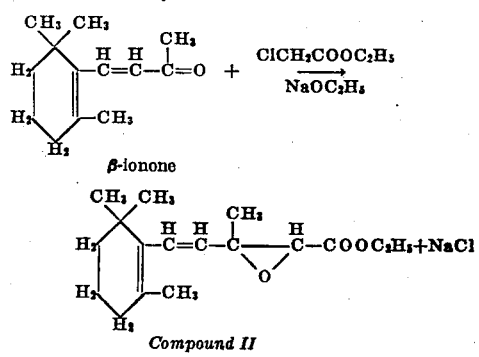

Compound II

Other alkali alcoholates advantageously may be used in this condensation provided they are free from alcohols.

The reaction of Equation A is understood to involve two reactions which proceed simultaneously or successively, i. e. the combination of the β-ionone and the ethyl chloroacetate forming the compound

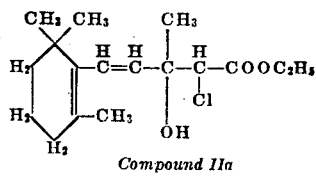

Compound IIa which reacts with the sodium ethylate yielding Compound II.

In the second step, Compound II is saponified with 10% alcoholic potash and the resulting glycidic acid, Compound III, Equation B, is separated and decarboxylated by distillation to produce 1-[2',6',6'-trimethyl cyclohexen-1'-yl]-3-methyl buten-1-al-4, Compound IV, Equation C.

EQUATION B

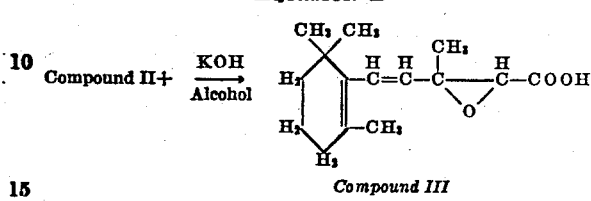

Compound III

EQUATION C

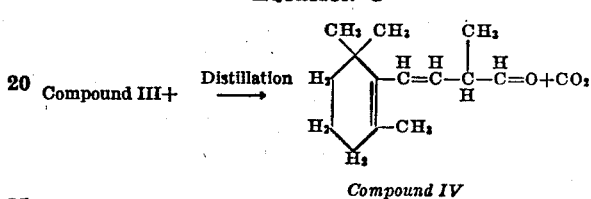

Compound IV

Compound IV may be prepared also by condensing, in an ethereal solution, β-ionone with ethyl dichloroacetate ($Cl_2CHCOOC_2H_5$) in the presence of dilute magnesium amalgam, yielding Compound IIa, Equation D, which latter may be saponified with alcoholic potash and the resulting saponification produce decarboxylated to Product IV as in Equations B and C.

EQUATION D

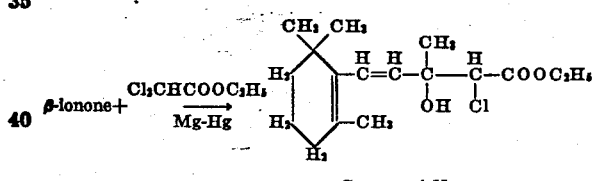

Compound IIa

Here it will be seen that Compound IIa is identical with the intermediate product of Equation A and when this Product IIa is subjected to saponification with alcoholic KOH as in Equation B, it is simultaneously or successively converted into Compound II and Compound III.

Instead of decarboxylating Compound III by distillation as described above, Compound III is mixed with two molecular equivalents of pyridine and the resulting pyridine salt distilled under a pressure of about 1 mm. and the fraction distilling at about from 90° C. to 103° C. (Compound IVa) collected. This fraction (Compound IVa) serves in the remainder of the process described hereinafter in the same way as Compound IV but evidence, such as its boiling point, spectroscopic examination, and absence of aldehydic properties, indicates that it is not Compound IV but a compound of the formula

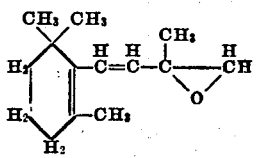

*Compound IVa*

In the third step, Compound IV or Compound IVa is condensed with sodium or lithium acetylide in a mixture of anhydrous ether and liquid ammonia at temperatures between —55° and —70° C. After the reaction is over, the ammonia is removed and the product treated with a dilute solution of tartaric acid, although aqueous solutions of ammonium sulfate, ammonium chloride or other organic acids may also be used. The resulting Compound V or Compound Va, Equations E and Ea, is extracted from this mixture in an impure state and may be purified either by high vacuum distillation in an inert atmosphere or by preparing its phthalic acid ester by reacting the mixture with phthalic anhydride in pyridine solution. The phthalic acid ester is subsequently saponified to obtain the pure acetylene carbinols, Compound V or Compound Va.

EQUATION E

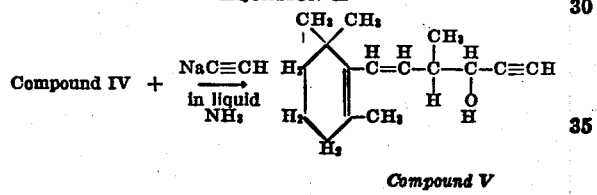

*Compound V*

EQUATION Ea

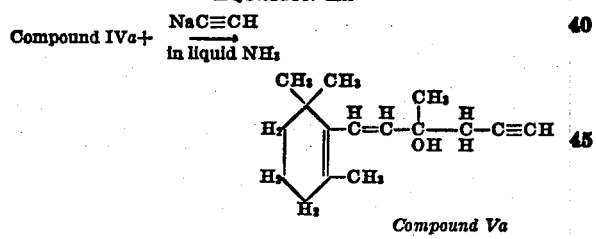

*Compound Va*

It will be observed that Compounds V and Va are identical excepting that the positions of the hydrogen atom and the hydroxyl group on the third and fourth carbon atoms of the side chain counting from left to right are reversed.

Compound V or Compound Va may be prepared also (see Equation F) by the interaction of the mono-Grignard of acetylene (HC≡CMgX) and Compound IV or Compound IVa, respectively.

EQUATION F

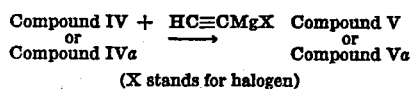

(X stands for halogen)

In the fourth step, Compound V or Va may be dehydrated by distilling under high vacuum with small amounts of naphthalene sulfonic acid or p-toluene sulfonic acid yielding compound VII directly (see Equation G).

EQUATION G

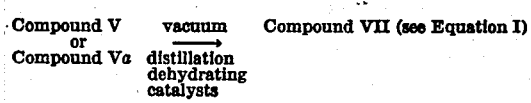

Thus it will be seen that both Compounds IV and IVa may be treated in the same manner to yield Compound VII.

However, better yields of Compound VII are obtained by preparing from Compounds V and Va the halides thereof, Compounds VI and VIa, Equations H and Ha, and subsequently removing hydrogen halide with alcoholic potash (see Equations I and Ia).

EQUATION H

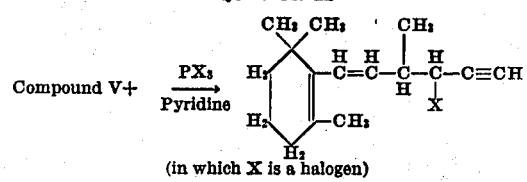

(in which X is a halogen)

*Compound VI*

EQUATION Ha

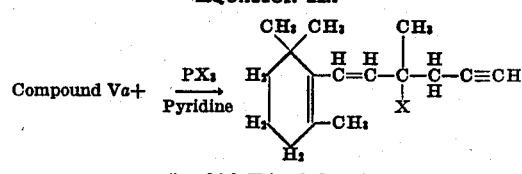

(in which X is a halogen)

*Compound VIa*

It is observed that Equation Ha works best with the chloride, less well with the bromide, and poorly or not at all with the iodide.

EQUATION I

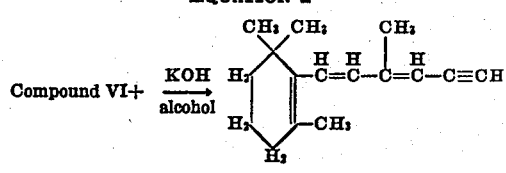

*Compound VII*

EQUATION Ia

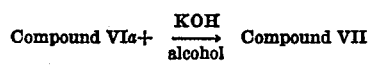

Still another method of converting Compound V or Compound Va into Compound VII is to form the Grignard of Compound V having the formula

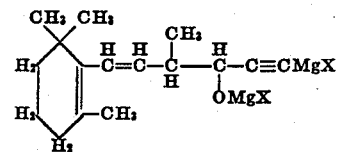

(X stands for halogen)

*Grignard of Compound V* or the Grignard of compound Va having the formula

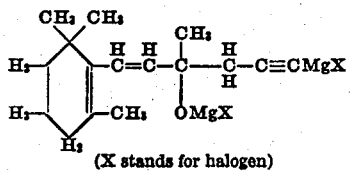

(X stands for halogen)

*(Grignard of Compound Va)* and mix either of said Grignard compounds with exactly one mol of

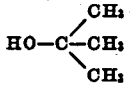

and distill the mixture under a high vacuum.

In the fifth step the Grignard or alkali metal acetylide of Compound VII is prepared by allowing it to react in ether solution with ethyl magnesium bromide or metallic lithium, for example: To the Grignard or alkali acetylide of Compound VII is slowly added methyl vinyl ketone

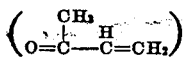

whereby the Product VIII is formed (see Equation J).

EQUATION J

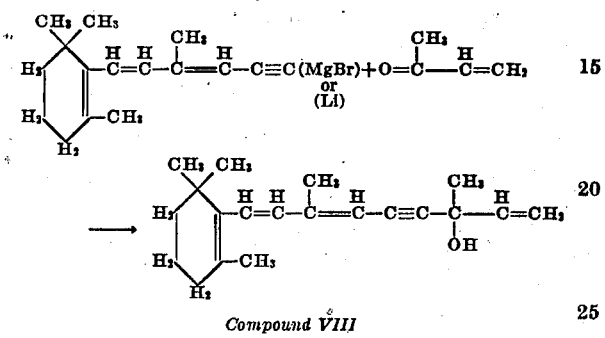

Compound VIII

In the sixth step Compound VIII is partially hydrogenated catalytically at room temperature using gaseous hydrogen and palladium black catalyst deposited on calcium carbonate or barium sulfate yielding Compound IX, Equation K. Another useful method for the partial reduction of Compound VIII to produce Compound IX is the use of an active iron catalyst, made by leaching with alkali the aluminum from an aluminum-iron alloy, and hydrogen under a pressure of about 50–75 atmospheres and temperatures not higher than 100° C. (see Equation K).

EQUATION K

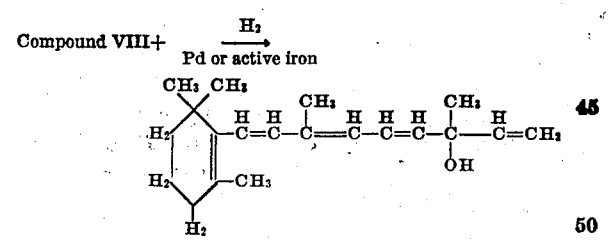

Compound IX

In the seventh step, Compound IX may be treated with acetic anhydride to form the acetic ester of vitamin A, Compound XI, Equation L.

In this step any suitable acid anhydride other than acetic anhydride, such as propionic and its higher homologues up to and including palmitic and stearic and other organic acid anhydrides, such as benzoic acid anhydride, could be employed to produce the corresponding vitamin A esters, any of which may be converted into vitamin A by saponification, as described hereinafter.

EQUATION L

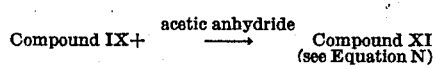

Better yields of the acetate are obtained when Compound IX is treated first with a halogenating agent such as phosphorus tribromide in pyridine yielding Compound X, Equation M, which latter is treated with potassium acetate yielding Compound XI, Equation N.

In this step Compound IX may be treated with any other suitable halogenating agent such as phosphorus trichloride or thionyl chloride and the resulting halogen Compound X converted into any desired organic acid ester of vitamin A by treating it with the alkali metal salt of the desired acid in the presence of the free acid.

Still another method of making the esters of vitamin A is to treat Compound XV or Compound XVa with acetic or any other suitable organic acid anhydride in the presence of the alkali metal salt of said acid and heat the mixture in vacuum thereby directly producing the acid ester of vitamin A.

EQUATION M

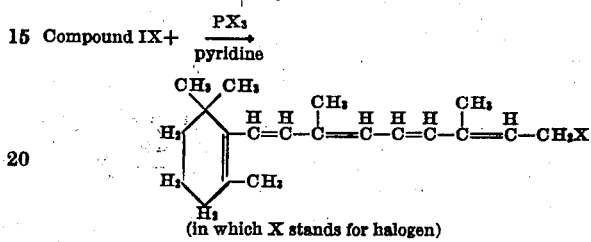

(in which X stands for halogen)

Compound X

EQUATION N

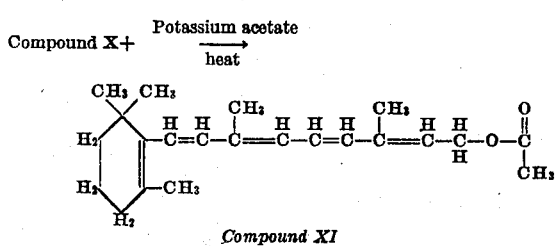

Compound XI

The vitamin is finally prepared by saponifying Compound XI, Equation O, or by treating Compound X with silver hydroxide (see Equation P).

EQUATION O

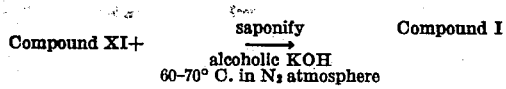

EQUATION P

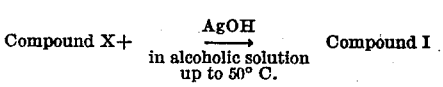

In the preparation of Compound XI, the following alternative route may be used: Methyl vinyl ketone is condensed with sodium or lithium acetylide in liquid ammonia to produce Compound XII, Equation Q, which latter is then converted into the Grignard XIII, Equation R, by interaction with ethyl magnesium bromide. The Grignard XIII is allowed to react in ether solution with the Compound IV or IVa followed by hydrolysis with tartaric acid or ammonium sulfate to produce Compound XIV or XIVa, Equation S or Sa.

EQUATION Q

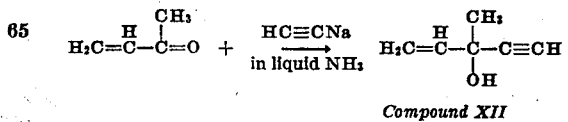

Compound XII

EQUATION R

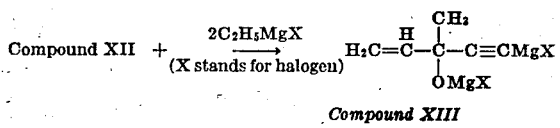

Compound XIII

EQUATION S

Compound IV + Compound XIII $\xrightarrow[\text{tartaric acid or }(NH_4)_2SO_4]{\text{followed by hydrolysis with}}$

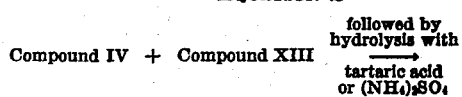

*Compound XIV*

Compound IVa + Compound XIII $\xrightarrow{\text{followed by hydrolysis}}$

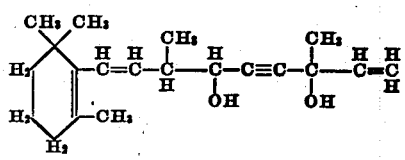

*Compound XIVa*

Compound XIV or XIVa is then partially reduced to Compound XV or XVa using the catalysts and conditions described above (see Equations T and Ta).

EQUATION T

Compound XIV + $\xrightarrow[\text{Pd on CaCO}_3\text{ or BaSO}_4]{H_2}$

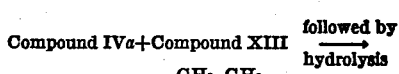

*Compound XV*

EQUATION Ta

Compound XIVa + $\xrightarrow[\text{catalyst}]{H_2}$

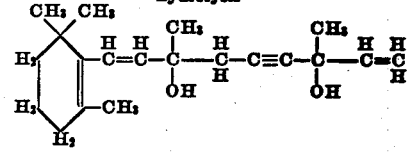

*Compound XVa*

An alternative method used to prepare Compound XIV or XIVa consists in the interaction of the Grignard of V or Va with methyl vinylketone (see Equations U and Ua).

EQUATION U

Grignard of V

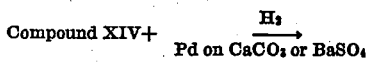

(X stands for halogen)

EQUATION Ua

Grignard of Va

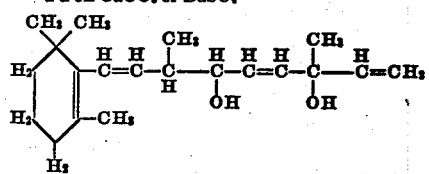

(X stands for halogen)

Compound XV or XVa is halogenated with a suitable agent such as a phosphorus trihalide, e. g. phosphorus trichloride or tribromide in pyridine at 0° C. yielding Compound XVI or XVIa, Equations W and Wa, and the latter are dehydrohalogenated, for example, by treating with exactly one mol of potassium hydroxide in alcohol to yield Compound X, Equation Y.

EQUATION W

XV + $\xrightarrow[\text{Pyridine at 0° C.}]{\frac{1}{3}PX_3}$

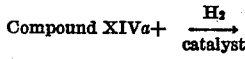

(In which X stands for halogen)

*Compound XVI*

EQUATION Wa

XVa + $\xrightarrow[\text{Pyridine at 0° C.}]{\frac{1}{3}PX_3}$

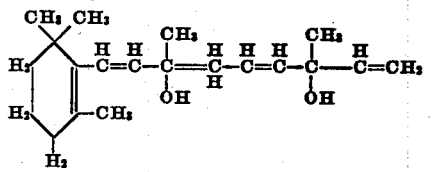

(In which X stands for halogen)

*Compound XVIa*

(The above reactions work better with the chloride than with the bromide.)

EQUATION Y $\begin{matrix}\text{XVI}\\\text{or}\\\text{XVIa}\end{matrix}$ + $\xrightarrow{\text{KOH}}{\text{alcohol}}$ Compound X A more detailed account of the principal reactions is to be found in the following pages.

PREPARATION OF GLYCID ESTER COMPOUND II, FIRST STEP, EQUATION A

Twenty-four grams of metallic sodium is dissolved in about 300-400 cc. of absolute ethyl alcohol in a one liter filter flask fitted with a reflux condenser. It has been found preferable to add all of the sodium at once and after it had gone into solution, the alcohol is removed under reduced pressure at temperatures ranging from 160-170°. A white sodium ethylate results. This is added slowly to a vigorously stirred mixture of 192 grams of β-ionone, 122 grams ethyl chloroacetate and 110 cc. of anhydrous toluene (benzene may also be used) at 0°. After all of the sodium ethylate had been added, stirring is continued until the mixture becomes homogeneous and brownish in color, then allowed to stand at room temperature for 7-10 hours. It is then heated on the water bath for 5 hours, cooled to room temperature and acidified with 25% acetic acid. The oil separating from this mixture is fractionated under reduced pressure and the fraction boiling at 152-155° (2-3 mm.) collected. A yield of about 80% of Compound II is obtained.

PREPARATION OF COMPOUNDS III AND IV, SECOND STEP, EQUATIONS B AND C

To obtain Compound III, 107 g. of compound II is mixed with one equivalent (21.6 g.) of 10% alcoholic potash and the mixture heated on the water bath for about two hours. The alcohol is then removed under reduced pressure and the residue dissolved in the minimum amount of water and the aqueous mixture extracted a few times with ether to remove any unsaponifiable matter. The aqueous solution is then treated with 25% phosphoric acid and the oily layer which separates extracted with ether. The ether extract is then dried with anhydrous magnesium sulfate, filtered and the ether removed under reduced pressure. The residue (Compound III) is heated in an atmosphere of nitrogen and in the presence of powdered glass or finely divided copper to facilitate the removal of carbon dioxide and the aldehyde formed finally fractionated under reduced pressure and the fraction boiling at 143-145° (5 mm.) collected. This has an $n_D^{27}$ 1.5032 and forms a 2,4-dinitrophenylhydrazone; M. P. 155-157° having the correct combustion analysis.

This aldehyde (Compound IV) has also been prepared by the alternative method (Equation D) described as part of the second step.

The preparation of Compound IVa from Compound III by reaction with pyridine and distillation has been sufficiently described above.

*Synthesis of 1-[2',6',6'-trimethyl cyclohexen-1'-yl]-3-methyl 3-epoxybutene-1 (Compound IVa)*

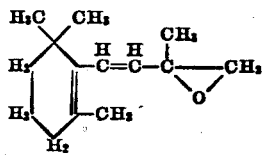

Compound IVa

To a mixture of 245 g. (2 mols) of ethyl chloroacetate and 110 g. of anhydrous, sulfur-free toluene contained in a three-necked, round-bottomed flask equipped with a mercury-sealed stirrer, a thermometer, and a calcium chloride tube and cooled to about —35° add 192 g. (1 mol) of β-ionone. By means of a Gooch rubber connection introduce, over a period of two hours with rapid stirring, 46 g. (2 mols) of finely powdered sodium ethoxide free from alcohol. Bring the mixture slowly to room temperature by allowing it to stand overnight with moderate stirring in an atmosphere of nitrogen. Continue stirring while the mixture is heated in nitrogen on the water bath for four hours, then cool to room temperature and neutralize with a solution of 167 g. of glacial acetic acid in 500 cc. of water. The mixture separates into two layers. Remove the non-aqueous layer and extract the aqueous layer with two 50 cc. portions of ether and combine the extracts with the non-aqueous layer. Remove the ether and the toluene and other low boiling constituents by subjecting the mixture to a vacuum distillation (10-20 mm.) in an atmosphere of nitrogen at the temperature of boiling water. Cool the residue (Compound II) to room temperature and add to it 840 cc. of 95% alcohol containing 85 g. of potassium hydroxide and reflux the resulting mixture in nitrogen for one hour under a slightly reduced pressure, then remove under reduced pressure approximately two-thirds of the alcohol. Cool the residue and pour it into 1500 cc. of deoxygenated water and extract the mixture successively with 500, 200 and 150 cc. of ether; combine the extracts and wash with 200 cc. of water and combine the latter with the aqueous solution. Add to the aqueous layer 200 cc. of fresh ether and acidify with 654 cc. of 20% orthophosphoric acid. Remove ether layer and extract non-aqueous layer successively with 200 and 100 cc. of ether and combine ether extracts; wash ether extracts twice with 110 cc. portions of water, dry over anhydrous magnesium sulfate, filter and remove ether under reduced pressure. The residue consists of almost pure glycidic acid (Compound III) containing small amounts of β-ethoxy acetic acid.

To decarboxylate the glycidic acid dissolve it in 158 g. (2 mols) of pure anhydrous pyridine and subject the mixture to a vacuum distillation in an atmosphere of nitrogen. The pyridine comes over at lower temperatures, then, the residue is fractionated and the fraction boiling at 95-140° (2 mm.) is collected and designated as the crude portion of Compound IVa. This product is found to contain a small amount of an organic acid, and to remove the latter the product is dissolved in 250 cc. of ether and the ethereal solution shaken vigorously twice with 200 cc. of 5% sodium bicarbonate solution. The ethereal solution is then dried over magnesium sulfate, filtered, the ether removed under reduced pressure and the residue fractionated using a Claisen flask attached to a 30 cm. Vigreux column and the fraction boiling at 90-103° (1-2 mm.) collected. $n_D^{20}$, 1.5110, $d_{25-25°}$ 0.940. This product fails to give an aldehyde test with fuchsin reagent and absorption spectrum in the ultra-violet region of the spectrum fails to show the presence of an aldehyde group either isolated from or conjugated with the double bonds.

The large range in boiling point (90°-103°) indicates the presence in the product of the cis and trans isomers. The boiling point of the major isomer is about 99° to 103°.

PREPARATION OF COMPOUNDS V AND VA, THIRD STEP, EQUATIONS E AND EA

To about 1 l. of liquid ammonia, in a 3-necked flask equipped with a Hershberg stirrer and a dropping funnel, was added 1 g. of hydrated ferric nitrate and 1 g. of metallic sodium and the mixture stirred for 1 hour while the temperature was kept at —55° to —70°. To this mixture was then added a trifle excess over half a mol of metallic sodium and the mixture stirred for half an hour longer. Dry acetylene was then passed through the mixture for several hours or until most of the blue color had assumed a gray-white color. To this mixture was then added, in the course of three hours, 46 g. of Compound IV or Compound IVa in 200 cc. of anhydrous ether taking care that the temperature of the mixture never rises above —60° and that the stirring is very rapid. After all of the aldehyde or oxide had been added, the mixture is stirred for 24 hours longer, keeping the temperature between —55° and —70°. The ammonia is then allowed to evaporate and the brownish residue treated with excess cold aqueous solution of d-tartaric acid and the resulting mixture extracted with ether from which the acetylene carbinol, Compound V or Compound Va, is isolated either by distillation under high vacuum ($10^{-3}$ mm.) or by preparing its acid phthalate ester in anhydrous pyridine and subsequently saponifying this ester to obtain the pure acetylene carbinol. The phthalic acid ester had the correct analysis and semi-micro-hydrogenation revealed the presence of 4 double bonds. The acetylene carbinol also gives a heavy whitish-gray precipitate with ammoniacal alcoholic silver nitrate solution characteristic for acetylenes.

Another procedure for the preparation of Compounds V and Va is as follows:

To about 2 l. of liquid ammonia, in a 3-necked flask equipped with a Hershberg stirrer and a dropping funnel, is added in small pieces 4.69 g. of lithium metal while the mixture is being stirred and a vigorous stream of dry acetylene passed through it at temperatures between the boiling point of liquid ammonia and $-70°$ C. The lithium is added at such a rate that the blue color formed in liquid ammonia is discharged before more is added. When all of the lithium had been added and converted into lithium acetylide, the mixture is cooled to about $-60$ to $-70°$ and a mixture of 121 g. (0.587 mol) of Compound IV or IVa, B. P. 92–104° (1 to 2 mm.), $n_D^{20}$ 1.5124, and 125 cc. of anhydrous ether is added in the course of 1 to 2 hours. Stirring is continued while acetylene is being passed through the mixture for 12–15 hours longer, then the ammonia is allowed to evaporate. The residue is treated at 0° with 120 g. of tartaric acid in 240 cc. of water and 100 g. of ice. The resulting mixture is then extracted successively with 300, 200 and 200 cc. of ether and the combined ether extracts washed successively with 200, 100 and 100 cc. of 10% salt solution. The ether extract is finally dried over anhydrous magnesium sulfate, filtered and the ether removed under reduced pressure. Finally, the residue is fractionated three times and the final fraction boiling at 65–80° ($10^{-3}$ mm.) and bath temperature at about 100° collected; yield, 75 g. (55% of theory). The product is a pale yellow oil having a sweet odor. It shows a Zerewitinoff number of 1.93 as against the calculated value of 2.0 and a hydrogenation number ($PtO_2$) of 4.8 as against the calculated value of 4.0 showing hydrogenolysis of the hydroxyl group in the presence of $PtO_2$ as the catalyst. It also gives a voluminous white precipitate with ammoniacal alcoholic silver nitrate solution characteristic for acetylenes.

Compounds V and Va have also been prepared, in anhydrous ether solution, by the interaction of Compounds IV and IVa with the mono-Grignard of acetylene ($HC \equiv CMgX$), (Equation F).

PREPARATION OF COMPOUNDS VI, VIA AND VII, FOURTH STEP, EQUATIONS H, Ha AND I AND Ia

Five g. of Compound V or Va is dissolved in about 15 g. of anhydrous pyridine and the mixture cooled between 0° and $-5°$ C. To this mixture is slowly added about 2.2 g. of phosphorus tribromide or a corresponding amount of phosphorus trichloride taking care that the temperature does not rise above 0°. After half an hour of standing at 0°, the mixture is warmed to about 60–70° for 15 minutes, then, without separating Compound VI or VIa, the mixture is treated with the calculated amount plus 10% excess of 10% alcoholic potash. The mixture is heated on the water bath for half an hour, then poured in four times its volume of water. The aqueous mixture is then extracted several times with ether and the ethereal solution shaken a number of times with a soluiton of d-tartaric acid to remove the pyridine. Finally, the ether solution is dried over anhydrous magnesium sulfate, filtered, and the ether removed. The residue is nearly pure Compound VII, although for further purification one can distill it under a very high vacuum.

Compound VII may also be prepared by distilling Compound V or Va under reduced pressure ($10^{-2}$–$10^{-3}$ mm.) in the presence of small amounts, 1 to 5%, of p-toluene sulfonic acid or naphthalene sulfonic acid (Equation G).

PREPARATION OF COMPOUND VIII, FIFTH STEP, EQUATION J

Five g. of Compound VII in 30 cc. of anhydrous ether is slowly added to an ethereal solution of the calculated amount of ethyl magnesium bromide and the mixture refluxed in an atmosphere of nitrogen for 5 to 10 hours. To this mixture is then slowly added at 0° with stirring about 2 g. of methyl vinyl ketone which is freshly distilled from small amounts of hydroquinone. The mixture is allowed to stand at room temperature overnight, then poured onto a mixture of ice and ammonium sulfate. After the Grignard mixture is completely hydrolyzed, the ethereal layer is separated and dried over anhydrous magnesium sulfate, filtered, and the ether removed under reduced pressure. The residue which is nearly pure Compound VIII may now be used for the next step.

For making Compound VIII from Compound VII via the alkali metal acetylide of Compound VII instead of the Grignard thereof, a mixture of equal parts of liquid ammonia and anhydrous ethyl ether is prepared and while being maintained at $-60°$ to $-70°$ C. small equivalent amounts of Compound VII dissolved in anhydrous ethyl ether and metallic lithium are added while rapidly stirring. After each addition, the blue color produced is permitted to completely disappear before another addition of Compound VII and lithium is made. After the desired amount of Compound VII and the equivalent amount of lithium have been dissolved, a solution of an equivalent quantity of methyl vinyl ketone in anhydrous ethyl ether is added dropwise, in the course of an hour, with continued stirring and while maintaining the temperature at $-60°$ to $-70°$ C. The stirring and maintenance of the temperature of $-60°$ to $-70°$ C. is then continued for about 10 hours, after which the temperature is allowed to rise and the ammonia to evaporate. The reaction mixture is then neutralized with tartaric acid dissolved in ice cold water and the resulting mixture extracted several times with ethyl ether. The combined ether extracts are dried with anhydrous magnesium sulfate, then filtered, the ether evaporated under reduced pressure and the residue subjected to a vacuum of from $10^{-4}$ to $10^{-5}$ mm. of mercury to vaporize and remove unreacted Compound VII and methyl vinyl ketone. The residue of this last treatment, on analysis, conforms to the formula of Compound VIII.

PREPARATION OF COMPOUND IX, SIXTH STEP, EQUATION K

Compound VIII is dissolved in absolute alcohol and to the solution added about one-twentieth of the weight of Compound VIII of 1% palladium black deposited on solid powdered carbonate made in accordance with methods described in the literature. Barium sulfate may be advantageously used as the support of the catalyst. The calculated amount of hydrogen to saturate one of the bonds of the triple bond is then allowed to be absorbed by the system. The mixture is then filtered and the filtrate distilled under moderately reduced pressure. The residue is nearly pure Compound IX.

The reduction of Compound VIII to Compound IX may also be accomplished under 50–75 atmospheres of hydrogen at not higher than 100° C. and in the presence of an active iron catalyst prepared by leaching the aluminum from an iron-aluminum alloy (Equation K).

PREPARATION OF COMPOUND XI,
SEVENTH STEP, EQUATIONS M AND N

Although Compound XI may be prepared by the treatment of Compound IX with acetic anhydride (Equation L), better yields are obtained by dissolving Compound IX in anhydrous pyridine, cooling to 0°, and adding the calculated amount of phosphorus tribromide, Equation M, taking care that the temperature does not rise above 0°. The mixture is then warmed to room temperature and kept there for two hours. The mixture is then dissolved in ether and the ethereal solution extracted with a cold 25% solution of acetic acid to remove the pyridine and the phosphorous acid. After the ethereal solution is dried over anhydrous magnesium sulfate, and filtered, the ether is removed under reduced pressure and the residue Compound X, Equation M, is dissolved in glacial acetic acid and treated, in an atmosphere of nitrogen, with freshly fused potassium acetate, Equation N. The mixture is gently heated for about 2 hours to not higher than 100° C., then poured in cold water and extracted with ether. The ethereal solution is separated, dried, and the ether removed. The residue contains considerable amount of Compound XI from which vitamin A can be easily prepared by saponifying it in the usual manner with alcoholic potash (Equation O). However, Compound XI may be used directly as a vitamin A substitute.

This application is a continuation-in-part of my application Serial No. 353,775, filed August 22, 1940.

I claim:

1. Process which comprises reacting a compound selected from the group consisting of

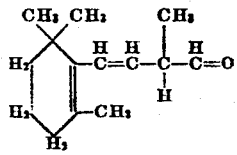

and

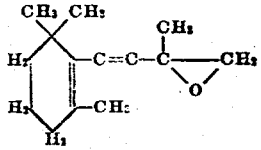

with an acetylide.

2. Process which comprises reacting a compound selected from the group consisting of

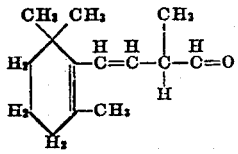

and

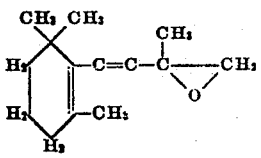

with an alkali metal acetylide.

3. Process as defined in claim 1 in which the acetylide is a mono-Grignard of acetylene.

4. As a new product a compound of the formula

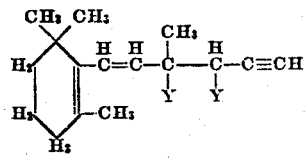

in which one Y represents OH and the other Y represents H.

5. As a new product a compound of the formula

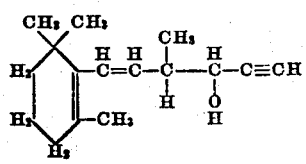

6. As a new product a compound of the formula

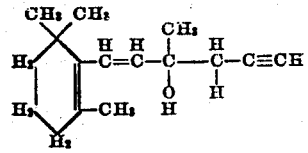

NICHOLAS A. MILAS.